US006912007B2

(12) United States Patent
Gin

(10) Patent No.: US 6,912,007 B2
(45) Date of Patent: Jun. 28, 2005

(54) SECURABLE CORNER SURVEILLANCE UNIT WITH DUAL WINDOWS

(75) Inventor: J. M. Jack Gin, Burnaby (CA)

(73) Assignee: Extreme CCTV Inc., Burnaby (CA)

( * ) Notice: Subject to any disclaimer, the term of this patent is extended or adjusted under 35 U.S.C. 154(b) by 343 days.

(21) Appl. No.: 09/987,491

(22) Filed: Nov. 15, 2001

(65) Prior Publication Data

US 2004/0012715 A1 Jan. 22, 2004

(51) Int. Cl.[7] .................... H04N 5/225

(52) U.S. Cl. .................... 348/373; 348/143

(58) Field of Search .................... 348/143, 150–152, 348/373–376; 396/535

(56) References Cited

U.S. PATENT DOCUMENTS

| | | | | | |
|---|---|---|---|---|---|
| 4,616,257 | A | * | 10/1986 | Kloots et al. | 348/370 |
| 4,862,333 | A | * | 8/1989 | Brasket | 362/147 |
| 4,972,633 | A | * | 11/1990 | Wright | 52/27 |
| 5,136,483 | A | * | 8/1992 | Schoniger et al. | 362/545 |
| D354,973 | S | * | 1/1995 | Hisatune et al. | D16/203 |
| 6,215,519 | B1 | * | 4/2001 | Nayar et al. | 348/159 |
| 6,283,616 | B1 | * | 9/2001 | Zoroufy | 362/368 |

* cited by examiner

*Primary Examiner*—Tuan Ho
*Assistant Examiner*—Brian Jelinek

(57) ABSTRACT

This invention provides a surveillance camera unit that is suited for secure placement in an upper corner of a room, abutting two walls and a ceiling, allowing the day or night surveillance of an entire room with a field of view that captures the scene of the entire floor and all four walls, under bright light conditions and under no-light. The upper corner placement is ideal for minimizing the risk of an observed person grabbing onto the unit or tying something to it, either for purposes of destroying himself, the unit, or the surveillance camera equipment within the unit. The unit is substantially a truncated tetrahedron, with each of the four corners truncated and sealed. A back angle of a few degrees greater than perpendicular of each of the rear walls with respect to each of the other walls of the unit allows it to be mounted snugly within a corner even where the angles of the walls of the room are not square angles. A pair of windows in the corner unit, with an opaque wall separating the windows, allows illumination through one window without flashback off the window reaching the camera, which is pointed through the other window.

3 Claims, 2 Drawing Sheets

FIG. 3
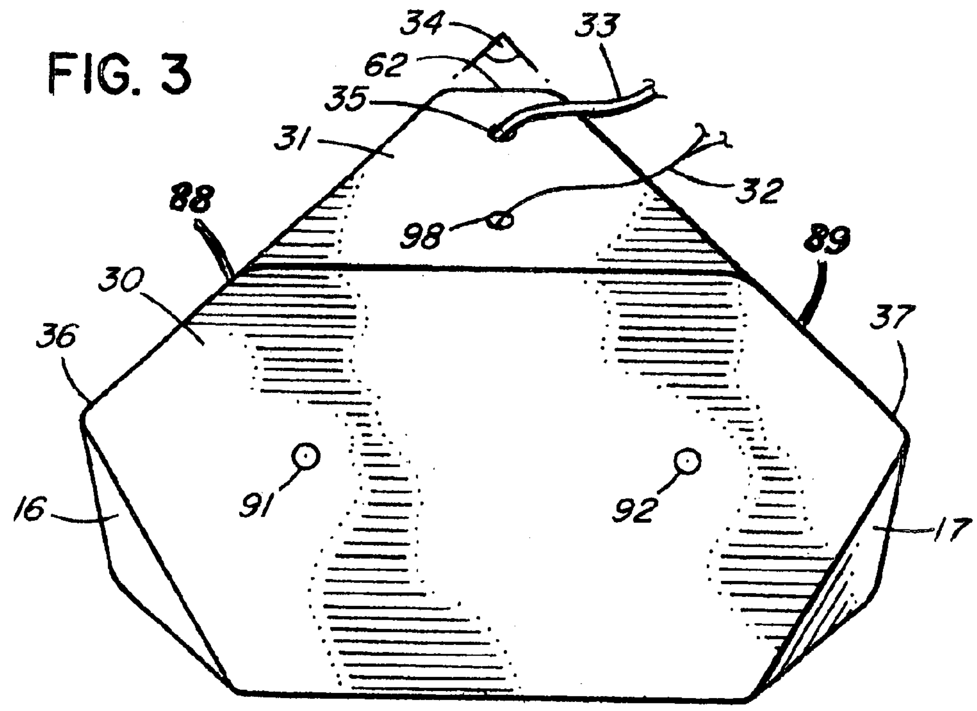
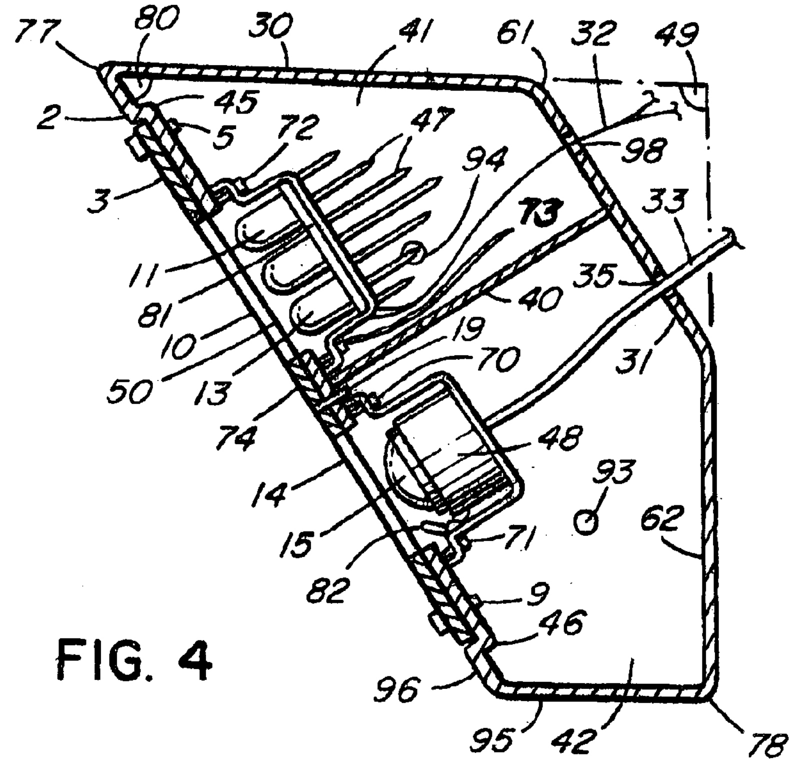
FIG. 4

SECURABLE CORNER SURVEILLANCE UNIT WITH DUAL WINDOWS

BACKGROUND OF THE INVENTION

This invention relates to security and surveillance cameras. In particular it relates to structures and containers for such cameras, and their need to be securely affixed in an area under surveillance in such a position as to capture the video information from the scene intended to be watched.

DESCRIPTION OF THE PRIOR TECHNOLOGY

A variety of methods exist to render a surveillance camera secure. One method is simply to suspend the camera out of reach of persons to be observed. Another method is to have the camera mounted within a protruding suspended transparent dome that is difficult to grip because it is curved and smooth. The surveillance camera can alternatively be mounted in another room behind a window in a wall of the room to be observed. The first method has the disadvantage that a person may be able to jump or climb on another person or object and reach the camera. The second has the disadvantage that the protruding of the dome makes it a target. It not only draws attention to itself, but it can be struck with an object from many directions. The third method has the disadvantage that it wastes space; a separate room may have to be dedicated to the operation of the camera.

A surveillance camera is typically placed at eye-level if the camera is securely positioned behind a one-way mirror or in another room behind a window. If it is placed in the room to be watched, it can be placed high up. None of the prior technology shows a camera that is securable in an upper corner of a room, providing the commanding field of view as disclosed below.

SUMMARY OF THE INVENTION

This invention provides a surveillance camera unit that is suited for secure placement in an upper corner of a room, abutting two walls and a ceiling, allowing the day or night surveillance of an entire room with a field of view that captures the scene of the entire floor and all 4 walls, under bright light conditions and under no-light. The upper corner placement is ideal for minimizing the risk of an observed person grabbing onto the unit or tying something to it, either for purposes of damaging or destroying himself, the unit, or the surveillance camera equipment within the unit. The design reduces the chances of self-inflicted harm such as suicide by hanging from a ceiling mount camera that has ledges and protruding parts to which a cord could be fastened. The placement in a corner makes it difficult to swing something at it without striking one of the walls or the ceiling first.

The unit is substantially a truncated tetrahedron, with each of the four corners truncated and sealed. An angle on the unit of a few degrees greater than perpendicular for each of the wall and ceiling hugging surfaces of the unit with respect to each of the other walls or ceiling hugging surfaces of the unit allows it to be mounted snugly within a corner even where the angles of the walls of the room are not square angles. The one-piece integral functionality of the unit makes it a fixture that allows a no-fuss, easy installation.

A pair of windows in the corner unit, with an opaque partition separating the windows, allows illumination through one window without flashback off the window reaching the camera, which is pointed through the other window.

The surveillance camera corner unit allows the camera to take in the view of the entire room from the corner in which it is mounted. This can be important is situations such as a prison cell or hospital room, where it is desired to view all activity within the room, including all four walls and every square foot of floor. A wide angle lens on a closed circuit camera within the unit completes a system for a room in which there is effectively no place to hide.

A ruggedized, no-grip housing for the unit prevents destruction by an irate prison convict or a deranged psychiatric patient. The camera is hidden and secure behind a translucent window.

A patient in the watched room would not be able to disrupt the camera by knocking it out of focus or pulling it from its signal output wires.

The illumination source is also hidden and secure behind a second translucent window. The illumination can be visible light or infrared for night camera imaging. In either case, the images will be far better if there is no reflection of the illumination from the illumination source within the unit back into the camera. It is desired not to have the illuminator merely illuminate the window of the unit and the camera merely to see images of the illumined window. This problem is solved by having dual windows on separate camera and illuminator compartments within the surveillance camera unit. The infrared illumination through the separate window of the unit in combination with the unobtrusive placement of the unit in an upper corner makes the unit very suitable for covert surveillance in low visible light conditions, such as night-time or in computer rooms.

The front face has a top edge and a left and a right bottom side edges that will abut the ceiling and left and right walls of the room in which the unit is to be mounted. The left and right top side facets and the bottom facet of the unit are formed along truncations of the top left and right and the bottom extensions of the front face. This design eliminates unnecessary material that would be used if the extensions extended to three pointed extensions of the front face, each of which could be a weak place on the unit because of the thinness of the material adjacent to each point that would otherwise result. The facets are obtusely angled from the front face to preclude a grip on the facet and the front face.

The left, right, and top surfaces are angled at greater than 90 degrees square. This ensures a snug, no-grip fit of the device to walls/ceilings that are less or greater than 90 degree square. Even a slight, typical deviation greater or less than 90 degrees between walls, or between ceiling and walls can cause a gap or opening with 90 degree backed devices can be utilized to cause damage to the device itself or as an anchor-point to cause harm to the occupant of the room under surveillance.

A preferred embodiment of the invention is thus a securable corner surveillance unit comprising:

a) a housing adapted for snug mounting in an upper corner of a room, the housing having a top surface for mounting against a ceiling and a left back surface and a right back surface for mounting against a left and right wall respectively;

b) a front perimeter portion in the housing joining a top edge on the top surface, a left edge on the left back surface, and a right edge on the right back surface;

c) a front plate within the front perimeter portion, having at least one surveillance window mounted in the front plate; and in which:

d) the top surface has an angle in the range of 91 to 95 degrees, or approximately 93 degrees, with respect to the back edge formed by the meeting of the left back surface and the right back surface;

e) the left back surface has an angle in the range of 91 to 95 degrees, or approximately 93 degrees with respect to the right back surface;

f) the front plate has a camera window and an illuminator window, the camera window being a transparent cover for a camera compartment within the housing, the illuminator window being a transparent cover for an illuminator compartment within the housing, the camera compartment and the illuminator compartment being separated such that light from the illuminator compartment reaches the camera compartment only through the camera window by means of a light-tight partition between the camera compartment and the illuminator compartment;

g) the front plate is detachably mounted flush with the front perimeter portion;

h) the housing is substantially a truncated tetrahedron, having left and right top side facets and a bottom facet, formed respectively along truncations of top left and right and bottom extensions of the front face, the top left and right facets and the bottom facet being obtusely angled from the front face to preclude gripping of any of the facets and an adjacent portion of the front face;

i) a surveillance camera is mounted in a camera compartment within the housing, the camera being fitted with a wide angle lens that gives a field of vision of at least 90 degrees in the horizontal and in the vertical planes.

j) an illuminator is mounted within an illuminator compartment within the housing, the illuminator comprising a bank of infrared light emitting diodes and heat-sink that emit infrared light at a frequency that is beyond the range of human-eye perception.

l) the left back surface and the right back surface do not extend to meet at a back edge on the housing but instead meet at a lower rear facet in order to leave a hollow between the housing and the edge formed by the walls of the room in which the housing could be mounted;

k) the top surface, the left back surface and the right back surface do not extend straight to meet at an upper rear corner point on the housing but instead meet along with the lower rear facet at a upper rear facet in order to leave a hollow between the housing and an area immediate adjacent to an upper corner of a room in which the housing could be mounted;

m) in which at least one of the upper rear facet and the lower rear facet has at least one aperture through which a power cord for the illuminator and a video output cord can be strung; and l) the front plate is at an angle of substantially 45 degrees with respect to the top surface of the housing.

DESCRIPTION OF THE DRAWINGS

FIG. 3 is a top view of the surveillance camera corner unit of the present invention.

FIG. 4 is a side cross-sectional view of the unit, showing the partition between the dual windows that compartmentalizes the illuminator from the surveillance camera.

DETAILED DESCRIPTION

Figure 1:
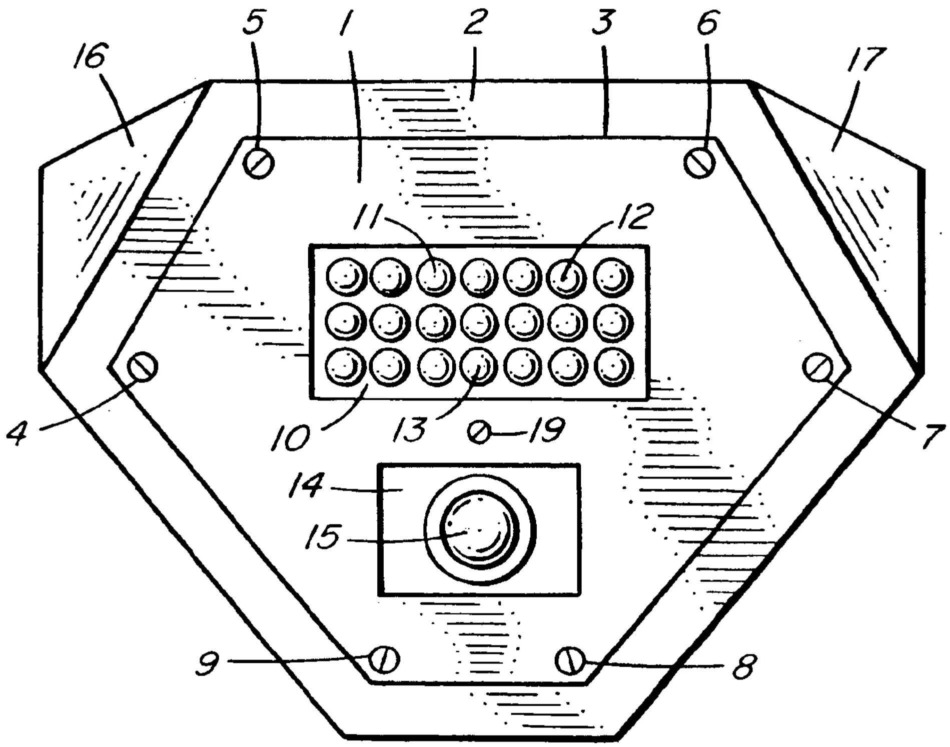
FIG. 1 is a front view of the surveillance camera corner unit of the present invention.

Referring to FIG. 1, the surveillance camera unit 1 comprises a housing 2 and a front face plate 3, secured with screws 4, 5, 6, 7, 8, 9, and central screw 19. The screws can be security screws requiring a particular pattern screwdriver to remove the screws, or they can be one-way screws that will accept a twisting force in their slots to screw them on, but have a sloped slot that will not provide a grip for counterclockwise twisting force by a screwdriver. Through the illuminator window 10 can be seen a bank of infrared light emitting diodes (IR LED's) such as at 11, 12, 13. The camera window 14 allows the camera lens 15 to view the scene from the corner in which the unit is mounted. The left facet 16 and the right facet 17 truncate the unit so it does not overly extend along the juncture of the ceiling and the left and right walls respectively and provide a point that could be pried or grasped.

Figure 2:
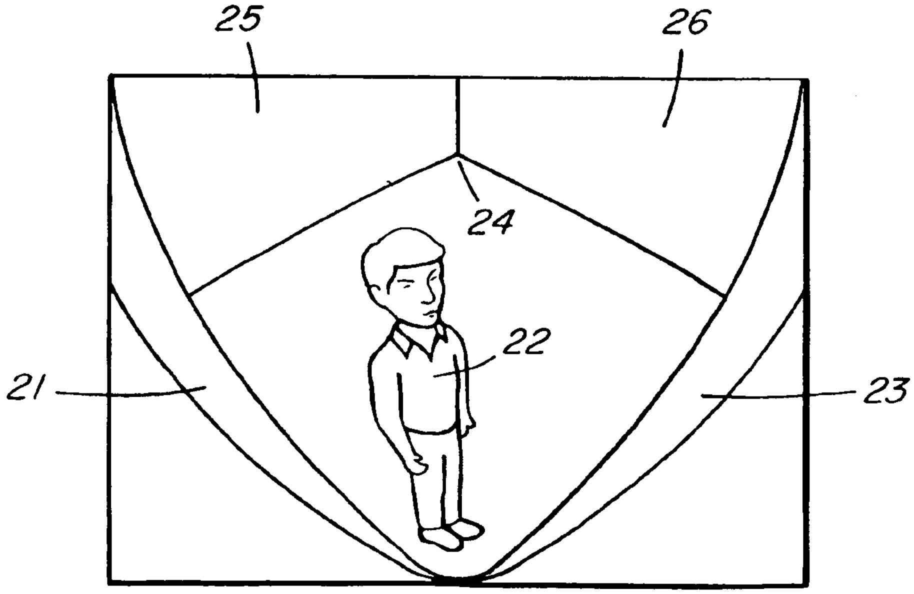
FIG. 2 is a perspective view of the walls, occupant, and far corner of a room through the surveillance camera of the corner unit installed in an upper corner of a room.

Referring to FIG. 2, a wide angle lens covering more than 90 degrees of view yields an image from the camera that shows the wall 21 that the figure 22 perceives as being the wall on his right and to the right of the corner surveillance unit, and the other wall 23 that the figure perceives as being the wall on his left, to the left of the corner surveillance unit. The far corner 24 of the room where the opposite walls 25 and 26 meet is visible.

Referring to FIG. 3, the top surface 30 of the unit has an intermediate rear facet 31 that allows a hollow between the unit and a corner formed by the two walls and the ceiling into which the unit can to be mounted. Such corners are often especially irregular from the perpendicular ideal, due to off-angle walls and ceiling and due to the agglomeration of plaster in the corner. The illuminator power cord 32 and the video output cord 33 protrude from an aperture 35 in the intermediate rear facet 31. The hollow allows working and slack space for the wires between the unit and the corner in which the unit will be installed, and enable the unit to be mounted without actually abutting the wall and ceiling at or immediately adjacent to the corner. This is important to achieve a snug fit, because there are often carpentry and plastering anomalies in a room's corner that are not even close to 90 degrees. The angle at 34 is itself slightly greater than 90 degrees, which allows the left upper outer corner 36 and the right upper outer corner 37 abutting the left back surface 88 and the right back surface 89 respectively to fit snugly against the left and right wall respectively even if the walls meet at a slightly less than 90 degree angle. The angle at 34 being 93 degrees when the unit is formed will allow the unit to be mounted snugly in most corners, surmounting typical plastering effect near the corner that is less than perpendicular. The rear facet 62 also provides a hollow against the vertical inside edge formed by the walls against which the unit can be installed, again to accommodate irregularities of carpentry and plastering along that edge.

Referring to FIG. 4, the housing 2 has top flange 45 and bottom flange 46 for securing the front plate 3 via screws 5, 19, and 9. The window 10 allows the LEDs 11 and 13 to shine infrared illumination out the window. The unit should use low-voltage, remote-controllable, low-energy LED infrared illumination to ensure sufficient non-visible lighting for effective camera operation under no-light night-time operation and under emergency back-up-power conditions. A voltage and current control board 81 controls the intensity of the LEDS 11 and 13 while ensuring long life for the LEDs. A photocell 82 allows for an illuminator compartment within the housing, the camera compartment and the illuminator compartment being separated such than light from the illuminator compartment reaches the camera compartment only through the camera window by means of a light-tight partition between the camera compartment and the illuminator compartment. automatic on/off infrared operation. Lenses are changeable via detachment of the front plate 3. Any reflected illumination from the LED's off of surface 50 of window 9 is retained within the illuminator chamber 41 and does not flashback into the camera lens 15, which is mounted within chamber 42 formed by partition 40, intermediate rear facet 31, rear facet 62, bottom facet 95, and bottom front perimeter portion 96. Any flashback is blocked by partition 40. The partition 40 also provides extra strength for the middle portion 74 of the front plate 3. The camera 48 is mounted to the front plate 3 by bolts 70 and 71, and sends its video signal out via video cord 33 exiting through lower rear aperture 35. Likewise fed through the upper rear aperture 98 is the power cord 32 for the illuminator LEDs as at 11 and 13. The bank of LEDs together with the heat sink 47 are mounted to the front plate 3 with bolts 72 and 73. The heat sink 47 dissipates the heat from the LEDs 11 and 13. Chamber 42 can be large enough to accommodate a pan and tilt motor and bracket for the camera for use with a zoom lens, but a single fixed focal length lens will cover a typical room if the lens is sufficiently wide angle. The top surface 30 of the unit extends from the top front edge 77 to the intermediate back edge 61, where it meets intermediate rear facet 31, to accommodate irregularities in the finish of the corner in which the unit could be installed. It is particularly important to achieve a snug fit at the top front edge 77 against the ceiling in order to prevent a hand, cord, or tool from being placed above the top front edge in an attempt to pull the unit down. The bottom corner 78 will fit snugly against a wall, because of the angle at 49 being greater than 90 degrees. An excellent angle at 49 would be 93 degrees, which would cover variations in most walls and ceilings from perpendicular at a distance from the ceiling and wall corner where the top at 34 in FIG. 3, should be 93 degrees, to allow a snug fit of the upper outer corners 36 and 37 against respective left and right walls.

The housing 2 should be made of a strong material, lightweight material such as aluminum, or ballistic-strength plastic sufficient to meet the potential challenges of the location where the unit is intended to be installed. It can be attached to the ceiling by screws through upper screw holes 91 and 92 in the top surface 30 as shown in FIG. 3, and to the wall through side screw holes 93 and 94, as shown in FIG. 4. These screws would all be accessible only when the face plate 3 is detached from the housing 2.

Referring to FIG. 4, the angle at 80 is 45 degrees. When the unit is constructed with a 45 degree tilt, the surveillance camera will provide an excellent perspective of small rooms such as prison cells, hospital care rooms, suicide watch cells, sleep labs and elevators. If the windows 10 and 14 are made from ¼ inch Lexan, they should be sufficiently strong to not be broken in such environments.

The smooth housing 2 allows for tight installations without any exposed wiring, making the unit very difficult to vandalize. An extremely tight fit into wall and ceiling corners is provided by the main back angles of the unit being in the range of 91 to 95 degrees, preferably in the range of 92 to 94 degrees, or approximately 93 degrees, to compensate for rooms that are not perfectly square adjacent to the corners. A hollow space immediately adjacent to the corner provided by intermediate rear facet 31 and rear facet 62 accommodates even more severe anomalies from perfectly perpendicular corners right in and immediately adjacent to the corner where it is desired to snugly mount the corner surveillance unit.

Applications for this surveillance camera corner unit include prisons, hospitals, warehouses, parking lots, schools, stores, and corridors.

The unit can also accommodate a second or third camera for specialty purposes, such as zoom or focus on a specific target within the room. Examples would be monitoring of the face or body language of a hospital patient, a sleep deprivation experiment subject, or a detainee during police interrogation.

The unit can also accommodate a directional, omnidirectional, or specific frequency range microphone to allow the recording of target audio information along with the video from the surveillance camera. The upper corner placement of the microphone in the securable corner unit gives it an excellent vantage for omnidirectional or directional pickup of the sounds in the room.

The within-described invention may be embodied in other specific forms and with additional options and accessories without departing from the spirit or essential characteristics thereof The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A securable corner surveillance unit comprising:

a) a housing adapted for snug mounting in an upper corner of a room, the housing having a top surface for mounting against a ceiling and a left back surface and a right back surface for mounting against a left and right wall respectively;

b) a front perimeter portion in the housing joining a top edge on the top surface, a left edge on the left back surface, and a right edge on the right back surface;

c) a front plate within the front perimeter portion, the front plate having at least one surveillance window mounted in the front plate;

in which the top surface has an angle of slightly greater than 90 degrees with respect to a back edge formed by the meeting of the left back surface and the right back surface, the left back surface has an angle of slightly greater than 90 degrees with respect to the right back surface, and the housing is substantially a truncated tetrahedron, having left and right top side facets, a bottom facet, and an intermediate rear facet, formed respectively by sealed truncations of corners that would otherwise be formed by extension of top, left, right, and front surfaces of the unit.

2. The securable corner surveillance unit of claim 1, in which the top left and right facets and the bottom facet are obtusely angled from the front face to preclude gripping of any of the facets and an adjacent portion of the front face.

3. The securable corner surveillance unit of claim 2, in which:

a) the top surface has an angle of 93 degrees with respect to the back edge formed by the meeting of the left back surface and the right back surface;

b) the left back surface has an angle of 93 degrees with respect to the right back surface;

c) the front plate has a camera window and an illuminator window, the camera window being a transparent cover for a camera compartment within the housing, the illuminator window being a transparent cover for an illuminator compartment within the housing, the camera compartment and the illuminator compartment being separated such that light from the illuminator compartment reaches the camera compartment only through the camera window by means of a light-tight partition between the camera compartment and the illuminator compartment;

d) the front plate is detachable mounted flush with the front perimeter portion;

e) at least one surveillance camera is mounted in a camera compartment within the housing, the camera being fitted with a wide angle lens that gives a field of vision of at least 90 degrees in horizontal and in vertical planes;

f) an illuminator is mounted within an illuminator compartment within the housing, the illuminator comprising a bank of infrared light emitting diodes and heat-sink g) the front plate is at an angle of substantially 45 degrees with respect to the top surface of the housing.

* * * * *